(12) United States Patent
Carturan et al.

(10) Patent No.: US 9,353,241 B2
(45) Date of Patent: May 31, 2016

(54) COMPOSITE MATERIAL FOR THE MAKING OF DECORATIVE ITEMS AND PROCEDURE FOR THE MAKING OF A DECORATIVE ITEM

(75) Inventors: Sara Maria Carturan, Albignasego (IT); Gianantonio Della Mea, Selvanzzano Dentro (IT); Riccardo Ceccato, Pergine Valsugana (IT); Sofia Nardo, Camponogara (IT)

(73) Assignee: ECOMETAL SA, Rancate (CH)

( * ) Notice: Subject to any disclaimer, the term of this patent is extended or adjusted under 35 U.S.C. 154(b) by 123 days.

(21) Appl. No.: 13/981,890

(22) PCT Filed: Jan. 23, 2012

(86) PCT No.: PCT/IB2012/050304
§ 371 (c)(1),
(2), (4) Date: Jul. 25, 2013

(87) PCT Pub. No.: WO2012/101568
PCT Pub. Date: Aug. 2, 2012

(65) Prior Publication Data
US 2013/0307188 A1   Nov. 21, 2013

(30) Foreign Application Priority Data
Jan. 26, 2011 (CH) ......................................... 133/11

(51) Int. Cl.
| | |
|---|---|
| *A44C 27/00* | (2006.01) |
| *C22C 32/00* | (2006.01) |
| *C08K 3/08* | (2006.01) |
| *B22F 1/00* | (2006.01) |
| *B22F 3/00* | (2006.01) |
| *C22C 5/02* | (2006.01) |

(52) U.S. Cl.
CPC ................. *C08K 3/08* (2013.01); *A44C 27/001* (2013.01); *B22F 1/0014* (2013.01); *B22F 1/0055* (2013.01); *B22F 3/00* (2013.01); *C22C 5/02* (2013.01); *C22C 32/0094* (2013.01)

(58) Field of Classification Search
None
See application file for complete search history.

(56) References Cited

U.S. PATENT DOCUMENTS

| | | | |
|---|---|---|---|
| 4,282,174 A | 8/1981 | Chase et al. | |
| 4,410,475 A * | 10/1983 | Chase et al. | .................. 264/122 |
| 4,822,694 A | 4/1989 | Randin et al. | |
| 5,578,383 A | 11/1996 | Beyer et al. | |
| 8,309,652 B2 * | 11/2012 | Morita et al. | ................. 524/588 |

FOREIGN PATENT DOCUMENTS

| | | |
|---|---|---|
| EP | 1918047 A1 | 5/2008 |
| JP | H05132702 | 5/1993 |

OTHER PUBLICATIONS

International Search Report and Written Opinion from International Application No. PCT/IB2012/050304 mailed Jun. 4, 2012.

* cited by examiner

*Primary Examiner* — Mary F Theisen
(74) *Attorney, Agent, or Firm* — Dorsey & Whitney LLP (57) ABSTRACT

Composite material for the making of decorative items which contains at least a polymeric component and at least a metallic powder dispersed in the polymeric component in an amount in weight between 2% and 95%. The metallic powder includes plate-like particles with a nanometric thickness of between 5 and 300 nm and a preferential growth in a two-dimensional surface with at least a dimension of between 0.6 and 100 μm. A procedure for the making of an ornamental article includes at least a phase for preparing at least a base component of a silicone resin; at least a phase for preparing the metallic powder; at least an initial phase for mixing the metallic powder with the silicone resin base component to obtain an even mixture; and at least an initial phase for reticulating the base component in the even mixture with the metallic powder distributed in a homogeneous way.

14 Claims, 4 Drawing Sheets

COMPOSITE MATERIAL FOR THE MAKING OF DECORATIVE ITEMS AND PROCEDURE FOR THE MAKING OF A DECORATIVE ITEM

CROSS-REFERENCE TO RELATED APPLICATIONS

This application claims the benefit of PCT Application PCT/IB2012/050304, filed on Jan. 23, 2012, and incorporated herein by reference.

STATEMENT REGARDING FEDERALLY SPONSORED RESEARCH AND DEVELOPMENT

Not Applicable.

FIELD OF THE INVENTION

This invention concerns a composite material for making decorative items and a procedure for making a decorative item, according to the introduction of the relative independent claims.

The composite material and the procedure will be used for making finished or semi-worked decorative items and, preferably, for making items of jewelry, costume jewelry and goldsmith's articles. The composite material and the procedure of this invention are therefore part of the manufacturing sector that produces decorative items and in particular precious and semiprecious items.

DISCUSSION OF RELATED ART

Traditionally, precious metals, like for example gold, silver and platinum, are materials that are widely used for making decorative items. Nevertheless, the high cost of these metals, the need to improve some of their mechanical properties, like for example hardness and wear resistance, as well as the need to adjust their color according to specific aesthetic requirements, sometimes makes it preferable to use precious metals as an alloy with other elements.

For some time now in the goldsmiths and jewelry sector there have been numerous alloys of precious metals, which differ from one another regarding their precious metal content and the alloying elements used in the alloy. The alloying elements are usually selected according to the mechanical properties and workability that they can give the alloy, as well as for their aesthetic characteristics, such as, for example, their color and their luster.

Some metals that are frequently used as alloying elements in alloys of precious metals, like for example nickel, cadmium, lead and cobalt, are however potentially toxic. The decorative items made with alloys containing these metals, especially when they are in contact with skin and acid substances, like for example sweat, can release these metals over time and can cause allergic reactions, sometimes quite serious, in the person that wears them.

Moreover, some well-known alloys of precious metals, especially at a low titer, have unsatisfactory chemical and physical properties, like resistance to oxidation and corrosion.

In order to overcome this latter drawback, there is widespread use of the deposition of a protective layer on the surfaces of the decorative items, in particular items made with metal alloys with or without precious metals. Generally, the deposition of these protective layers employs procedures that require the use of highly toxic substances, like for example galvanic electrodeposition. These procedures require the use of acids, like for example hydrochloric acid, sulphuric acid and nitric acid, or solvents, like for example chlorinated solvents, for the pickling and degreasing of the surfaces on which the deposition should occur, as well as the use of alkaline or acid baths containing for example cyanide, in which the decorative items are immersed during the electrodeposition phase. The above-mentioned substances, in addition to constituting a danger for the health of operators who carry out the deposition procedures, are released into the environment and linger in the form of residues in the decorative items, consequently being able to cause damage to the persons who use these decorative items.

Moreover, when the decorative item is no longer used, the recuperation of the precious metals of the alloy can be carried out only by means of very expensive and highly polluting procedures.

In the reference manufacturing sector for some time there has been a feeling that materials and procedures need to be developed that can make valuable decorative items that have good chemical-physical and mechanical characteristics, while keeping down the costs of the raw materials, production and the recuperation of the any precious metals that are present.

In this regard, there is a well-known procedure for example in U.S. Pat. No. 4,282,174 for making decorative items, which provides for an initial phase of the mixing of particles of a metallic material, in particular selected from gold, silver and platinum, with particles of a polymeric material. There is a phase for the preparation of the mix of metallic and polymeric particles in a mold, a phase for pressure molding the mix at a high temperature and a phase for taking the decorative item formed in this way out of the mold. The metallic particles, in particular, are introduced into the mix in a percentage equal to at least 92.5% in weight of the mix itself, and they are preferably in the form of powder with dimensions between 0.5 and 50 µm. The molding temperature should preferably be between 100 and 250° C.

The procedure described briefly above did not prove in practice to be free of drawbacks. As reported in the U.S. Pat. No. 4,282,174, itself, the decorative items obtained using the above-mentioned procedure have poor mechanical properties and an unsatisfactory surface finish. In particular, the precious metal incorporated in the polymeric material in this procedure here leads to the formation of items that have a poor shine.

Document U.S. Pat. No. 5,578,383 provides instructions on how to make jewelry starting with a composite mixture of precious metal powders, like gold, silver and platinum, with sizes in the range of 1-100 µm, of powders of a thermosetting plastic polymer that can be reticulated and an inorganic filler component like silica, silicates or aluminium powder. The drawbacks of the above-mentioned procedure are similar to those that can be found in the procedure connected to U.S. Pat. No. 4,282,174 and concern the difficulty of producing semi-worked items with a high degree of shine and luster.

Patent JP 5132702 refers to a process for making decorative items, which involves the preparation of a mixture containing precious metal powders (selected from gold, silver and platinum, and their alloys) and a cellulose-based organic binder in a percentage of 5-30%. This latter can be removed by means of sinterisation. In line with the instructions of this patent, the semi-worked item obtained has the color of the precious metal that you want to imitate.

The drawback of this procedure, as with the previous procedures, lies in the fact that the semi-worked item obtained, although having a color similar to that of the precious metal (or the alloy of precious metals) that you want to imitate, does not have the desired brilliance or shine.

SUMMARY OF THE INVENTION

In this context the main objective of this invention is to make available a composite material for making decorative items, which has better mechanical properties than the metal alloys available on the market.

Another objective of this invention is to make available a composite material for making decorative items which has improved aesthetic properties of brilliance and luster.

Another objective of this invention is to make available a composite material for making decorative items which allows you to obtain articles that need no additional surface finishes.

Another objective of this invention is to make available a composite material for making decorative items which has a precise uniform titer.

Another objective of this invention is to make available a composite material for making decorative items which has a high degree of elasticity and allows you to make decorative items that are particularly easy and comfortable to wear.

Another objective of this invention is to make available a composite material for making decorative items which is non-allergenic and does not release substances that are harmful for the person who wears the item.

Another objective of this invention is to make available a composite material for making decorative items which incorporates precious metals that can easily be recuperated.

Another objective of this invention is to make available a procedure for making decorative items which allows you to make items simply and quickly.

Another objective of this invention is to make available a composite material for making decorative items which is completely reliable.

Another objective of this invention is to make available a procedure for making decorative items which is ecological.

These and other objectives are all attained with the composite material for making decorative items and by the procedure for making a decorative item, according to the attached claims.

DESCRIPTION OF THE DRAWINGS

The technical characteristics of the invention, in line with the above-mentioned objectives, can clearly be found in the contents of the claims above and the benefits of it are even more evident in the detailed description that follows, made with reference to the attached diagrams, which depict a form that is purely by way of example and binding, where:

DETAILED DESCRIPTION OF THE PREFERRED EMBODIMENT

The composite material and the procedure in this invention are to be preferably used for the making of finished decorative items, and in particular articles of jewelry or costume jewelry, like for example necklaces, bracelets, earrings, pendants, brooches etc., or else for the creation of accessories like buckles, buttons and the like. Moreover, the same composite material and their procedure can be used in the making of semi-finished products, or else products that can be subjected to further working in order to attain finished decorative items or accessories.

In particular the composite material and the procedure in this invention are expected to be used for the making of decorative items and precious or semi-precious accessories.

The composite material for the making of ornamental according to this invention includes at least a substantially transparent polymeric component and at least a metallic powder of one or more precious metals, which can be present alone or in an alloy, dispersed in the polymeric component in an amount in weight between 2% and 95%.

In particular the precious metals should preferably be selected from the group containing gold, silver, platinum and their alloys.

By the expression substantially transparent polymeric component we mean to denote below a transparent polymeric component, or even just partially transparent or translucent, i.e. capable of transmitting light radiation and at the same time diffuse it.

In line with the basic notion of this invention, the metallic powder includes plate-like particles with a nanometric thickness of between 5 and 300 nm and a preferential growth in a two-dimensional surface with at least a dimension of between 0.6 and 100 μm.

These particles preferably have a substantially planar and polygonal shape, or else with very thin edges, so as to effectively reflect the light and provide the best possible shine to the composite material.

The dimensions and the form of the selected powders confer a surprising shine and lustre to the semi-worked item.

The dimensions of the metal powder particles, in particular, have proven in practice to be especially important for giving the finished decorative item the desired appearance and mechanical properties.

It was in fact observed that the particles with preferential growth on a two-dimensional surface with a dimension less than 0.6 μm cannot give the final composite material an adequate shine. These particles, in fact, with dimensions comparable to the wavelengths of light radiation in the visible spectrum (in particular in the field of blue), cannot reflect all the wavelengths of the light radiation and have a darker colour with respect to the original metal as it is usually known, namely with more muted tones.

On the other hand, it was observed that the particles with a plate-like or preferential growth in a two-dimensional surface with a size greater than 100 μm, could possibly be seen with the naked eye conferring the decorative item with an uneven appearance. Moreover, these latter particles have too great a mass and, as a result, foster the appearance of segregation phenomena in the composite material when the decorative items are being made.

In accordance with a preferred form of the composite material that is the object of this invention, the metallic powder contains gold particles (preferably in a basically pure state), in particular obtained using synthesis with a method that employs polyoils (as will be described more fully below), in the presence of capping agents that prevent the growth of the gold particles along a spatial direction, fostering, consequently, the formation of plate-like particles.

Preferably each of the metallic powder particles obtained in this way is basically composed of a mono-crystal, as far as possible free of reticular defects. The particles with these properties have morphological characteristics that make them particularly suited for being used in making the composite material of this invention. These particles have, in fact, a polygonal shape, due to the preferential growth of the single crystals in precise crystalline directions.

Figure 1:
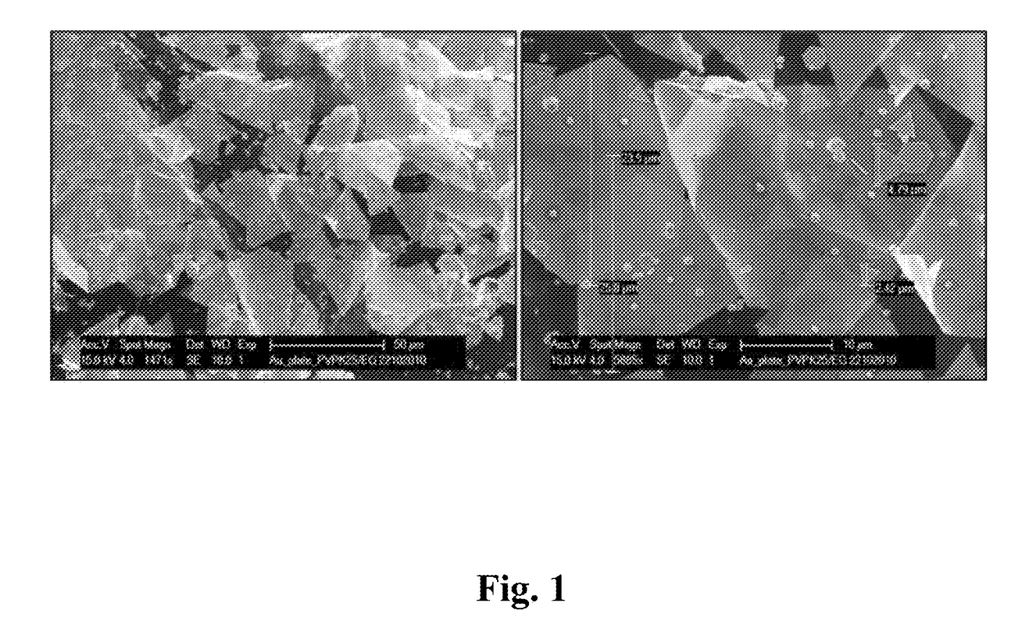
FIG. 1 shows two scanning electron microscope images at two different magnifications of gold particles belonging to a metallic powder for making the composite material that is the object of this invention.

Therefore, in the advantageous case of gold particles obtained using synthesis with the method employing polyoils mentioned above, each of such gold particles generally has a polygonal shape, triangular or hexagonal, as can be seen in the attached images, due to its preferential growth along certain directions of the crystalline lattice.

The metallic powder particles have a high degree of homogeneity regarding their size in order to give the finished item a homogeneous appearance and a constant precise titre). In particular, at least 70% and preferably about 90% of the particles have a preferential growth in a two-dimensional surface with at least a size of between 6 and 55 µm. This latter characteristic allows you to obtain a composite material with a mechanical property that is basically identical in all its points and with a uniform appearance.

Beneficially, the substantially transparent polymeric component in the composite material is an elastomeric material, so the decorative items made it are particularly smooth and comfortable to wear, in addition to having improved aesthetic properties of shine and brightness with respect to the traditional metal alloys available on the market. This transparent elastomeric material could be, for example, selected from polyurethanes, latexes, silicones and natural rubbers.

Preferably the polymeric component is an elastomeric silicone resin.

Elastomeric silicone resins have chemical-physical and mechanical properties that make them particularly suited for being used in the composite material for making the decorative items that are the object of this invention. In particular, elastomeric silicone resins have excellent resistance to high temperatures and keep their flexibility also at low temperatures (even up to −40° C.), therefore making it possible to safely use the decorative items made from them also in harsh environmental conditions, without any risk that these items could deteriorate, weaken and break. Moreover, elastomeric silicone resins have high percentages of elongation at break (between 50 and 400%), high tensile strength (between 0.4 and 6 MPa) and, depending on their specific composition, have a hardness that varies between a minimum of about 10 Shore A and a maximum of about 80 Shore A. Depending on the characteristics of greater or lesser softness that you want to give the decorative item, it is therefore possible to make the composite material of this invention by selecting a silicone resin with a suitable hardness.

The intrinsic mechanical characteristics of the silicone resin allow the particles that have been incorporated to be retained without the particles themselves being dispersed into the environment, not even those more on the surface, even when the decorative item is subjected to stresses or wear and tear.

Elastomeric silicone resins, finally, have excellent properties of chemical inertia and resistance to ageing, which make them surprisingly adapt for making decorative items that keep their aesthetic and mechanical characteristics over time.

Therefore silicone resin gives the composite material, which is the object of this invention, high elasticity and makes it especially resistant to tearing, to ageing, to chemical aggression and to oxidisation, for the uses it is made for in accordance with this invention. The composite material of this invention is also non-toxic and non-allergenic. The decorative items made in this way, therefore, do not release any harmful substances and can remain in contact with the skin without any risk of provoking undesired allergic reactions for the people wearing them.

In line with a preferred form of this invention, the polymeric component is a silicone resin that can be vulcanised at room temperature. This latter type of resin, in particular, allows decorative items to be made at room temperature, with subsequent low production costs.

Beneficially, silicone resin has a light radiation transmission percentage in the visible spectrum greater than 70%, measured in conformity with ASTM D1003 with a thickness of 6 mm. As a result, the metal powder particles in the polymeric component can be reached by the light radiation and can reflect it, conferring the composite material and the decorative items obtained with it optimal properties of brilliance and shine.

A form that is the object of this invention and a procedure for making a decorative item, in particular with a composite material of the type described above.

This procedure includes at least a phase for preparing a silicone resin base component and at least a phase for preparing a metallic powder with the characteristics described above, namely containing plate-like particles with a nanometric thickness of between 5 and 300 nm and with a preferential growth on a two-dimensional surface with a dimension between 0.6 and 100 µm.

The metallic powder could be synthesised and will preferably have, as mentioned earlier, a high degree of uniformity of dimension.

More precisely, in accordance with a preferential form of this invention, the metallic powder contains plate-like particles of gold and the phase for the preparation of the metal powder includes a phase for synthesising the plate-like gold particles using the polyoils method, in the presence of capping agents that prevent their growth in one or more spatial directions. In particular, the phase for synthesising the gold particles is preferably obtained using a phase for dissolving the gold in aqua regia and, successively, a phase for adding to this solution a mild reducing agent, in particular ethylene glycol, and polyvinylpirrolidone. In an absorption phase, the polyvinylpirrolidone molecules are absorbed on the surface of the gold particles, preferably in certain directions of the crystalline lattice of each gold particle.

In a later stage for growing the gold particles, the gold atoms in solution, following the reducing action exercised by the ethylene glycol, tend to attach themselves to the particles along the directions of the crystalline lattice of these latter that have not occupied by the polyvinylpirrolidone molecules. The gold particles, therefore, increase in size acquiring a basically planar form. Moreover, these particles tend to grow along precise directions of the crystalline reticule, assuming, as said earlier, a polygonal form, in particular triangular or hexagonal.

These same gold particles can nevertheless be obtained using different synthesis methods since they preferably have a form that is equally substantially plate-like and polygonal.

The silicone resin base component and the metallic powder are prepared, using weight measurement, in an amount calculated in accordance with the percentage that you desire to give to the final decorative item. The metallic powder, in particular, is prepared in an amount of between 2 and 95% in weight with respect to the total weight of the composite material to be used for making the final decorative item.

A mix is obtained from the successive addition of the resin base to the metallic powder.

Therefore there is at least an initial phase for mixing the above-mentioned mixture, namely the metallic powder, with the silicone resin base component, to obtain an even mixture. More precisely, the resin base is added to the metallic powder and the mixture is stirred (for example using a mechanical magnetic stirrer, or else through manual stirring).

The procedure includes also an initial phase for reticulating the base silicone resin component in the even mixture with the metallic powder distributed in a homogeneous way.

The silicone resin used for obtaining decorative articles or accessories, in particular, could be either mono-component or bi-component.

More precisely, in the case of a mono-component resin, the base component in the above-mentioned preparatory stage could, for example, composed of a silicone resin with silanols (—Si—OH) and reacted with a trifunctional silane (where functional groups (—X) can be residues of an amine, an acetate, an oxime or an alcohol) according to a reaction during which the Si—OH groups of the silicone resin are replaced by the —X groups:

where:

The reticulation phase is, in this case, brought on by the moisture in the air and the base component reticulates using the following condensation reaction and hardens in a few hours:

Preferably the silicone resin used is a bi-component resin, which includes a base component and a crosslinking agent.

In this case, the reticulation of the resin can take place, for example, using an addition reaction catalysed by peroxides. The base component could be made up of a silicone resin with terminal vinyl groups ($CH=CH_2$) and the crosslinker could be composed of a silicone resin with, for example, methyl groups (—$CH_3$). The resin could reticulate using the following initial reaction for forming radicals:

This reaction proceeds through reticulation between the radical groups in the polymeric chain and the terminal side chain vinyl groups and takes place only at high temperatures, or else at temperatures above 130° C. or using ultraviolet radiation.

Otherwise the reticulation of the bicomponent resin could take place using a tin-catalysed condensation reaction. In this latter case, the base component could be, for example, a resin with terminal silanols (Si—OH) and crosslinker could be silicic acid ester $Si(OR)_4$. The reticulation reaction, catalysed by a tin compound, like for example tin dibutyl dilaurate, will therefore be as follows:

In line with a preferential and in no way restricted realisation of the procedure that is the object of this invention, the silicone resin used is of the bicomponent variety reticulated at room temperature using a catalysed addition reaction.

With respect to the reticulation reactions mentioned earlier, in fact, this latter reaction has some clear benefits. Firstly, during the reticulation using the addition reaction the resin does not release any by products and, as a result, does not undergo any volumetric shrinkage that could render the creation of decorative items having the desired form and size particularly difficult. Moreover, this reticulation reaction is quite quick, usually taking just a few hours.

The procedure in this invention provides for a stage for preparing a reticulating component and a stage for preparing a catalyst. Preferably the base component used in the procedure of this invention contains Polydialkyl siloxane, Polydiaryl siloxane or Polyalkyl/polyaryl siloxane with vinyl functional groups ($CH=CH_2$) with the following formula:

where R=alkyl (methyl, ethyl, propyl . . . ) and $R^1$=aryl (radical benzene, toluene . . . ).

This base component has the advantage of an average molecular weight of between 500 e 16.000 g/mol and a viscosity between 1 and 100,000 mPas.

The reticulating agent preferably contains at least Polyalkyl(hydro) siloxanes or Polydialkyl/polyaryl hydro siloxanes with hydrides groups (S—H) present in intermediate positions and/or in terminal positions in the polymeric chain, as in the formula:

where R=alkyl (methyl, ethyl, propyl . . . ) or aryl (radical benzene, toluene) and $R^1$=H (terminal hydrate) or alkyl.

In this case, the amount of the silicone resin base component and the amount of the reticulating component that need to be prepared are calculated in a way that the stoichiometric ratio (R) between the vinyl groups ($CH=CH_2$) and the hydrides groups (Si—H) respectively of the base component and the reticulating component is between 1 and 4.

The reaction catalyst should preferably be platinum, rhodium or palladium. Preferably the catalyst should be platinum-based, with a concentration of platinum between 10 e 200 ppm and preferably around 20 ppm.

After the initial phase for mixing the metallic powder with the silicone resin in order to obtain an even mixture, there should preferably be at least an initial phase for degassing the mixture in a vacuum chamber and preferably at a pressure less than 1 mbar, in order to remove any air trapped in the mixture. This degassing phase is important for ensuring the creation of a decorative article without any air bubbles that would have a huge impact on the mechanical strength and the optical transparency.

After the above-mentioned initial degassing phase there is the phase for reticulating the base component in the even mixture with the metallic powder distributed in a homogeneous way.

Preferably, when the mixture has reached, after an initial part of the reticulation phase, a viscosity between 5,000 and 15,000 mPas and preferably more than 10,000 mPas, namely when the mixture looks like a high viscosity liquid with the metallic powder dispersed evenly in it, there is a phase for casting the mixture in a mold for forming the decorative item. The casting is carried out in a vacuum and/or in ambient pressure, depending on the shape of the item you want to make.

A second part of the phase for reticulating the silicone resin component in the mixture is then carried out inside the mold. In order to reduce the time needed for reticulating the mixture, the second part of the reticulation phase is preferably carried out inside an oven or a stove, at a temperature between 40° C. and 100° C. and preferably around 60° C. The second part of the reticulation phase can also be carried out at room temperature, without leaving the ambit of this invention.

Beneficially, the second part of the reticulation phase is continued at least until the decorative article obtained by the reticulation of the mixture can no longer be deformed under the action of its own weight.

Then there is a phase for extracting the article form the mold.

In order to facilitate this phase for extracting the item from the mold, the mold can previously be coated or protected with a release agent. Otherwise the mold could itself, for example, be made of a silicone resin, thereby not needing to be coated or treated with release agents on the surface, given the excellent non-stick properties of silicone resins.

The decorative item obtained in this way, when the silicone resin has been completely reticulated, is finished and ready to be worn, without requiring any further work.

If the silicone resin contains a crosslinker in order to allow the silicone resin to reticulate, the procedure provides for a phase for the addition of this reticulating component to the silicone resin. This addition phase can have an initial phase for mixing the base component with the metallic powder, preferably after this initial mixing phase.

Preferably, during the initial mixing phase, the silicone resin and the metallic powder are mixed and the mixture obtained is subjected to the degassing phase. The crosslinker is then added to the mixture and there is a second phase for mixing this reticulating component with the mixture.

Beneficially, the procedure includes in this latter case a second phase for degassing the mixture with the added reticulating component. This second degassing phase could be carried out after the second mixing phase, or else it could be carried out at the same time.

The pot-life, the time the silicone resin can be worked after the addition of the reticulating agent to the mixture and before the increase in the viscosity due to the reticulation makes any work impossible, has to be long enough to allow any second stage for degassing and the casting of the resin in the mold. If the reticulation reaction takes place in too rigid a manner, it will be possible to provide a phase for adding one or more retarders to the mixture, added with the reticulating agent and with any catalyst. The pot-life should not, however, be too long, or else the mixture should not remain with a low viscosity for excessively long times, in order to not foster phenomena of sedimentation of the metallic powder in the mixture.

If the pot-life of the resin is particularly long, and especially more than 15 minutes, in order to prevent sedimentation of the metallic powder particles the mixture should be continually stirred until the right degree of viscosity is attained, preferably about 10,000 mPas, which allows the mixture to be cast in the mold, and at the same time allowing the concentration of the metallic powder to be uniform throughout the entire decorative item obtained in this way.

If a catalyst is used in the reticulation of the silicone resin, the procedure includes a phase for adding this catalyst to the reticulating agent. It would be better that this phase for adding the catalyst take place before the phase for adding the reticulating agent to the silicone resin: the catalyst is therefore previously mixed to the reticulating agent and the mixture obtained in this way is added to the mixture of the silicone resin and the metallic powder.

With reference to the decorative items obtained with silicone resin, if so desired the precious metal powder in the items, or else in the process waste or the like, can easily be recuperated. It is sufficient, in fact, that the sample is heated in an oxidising atmosphere, at a temperature higher than 600° C. until the silicone resin decomposes into silicon oxide, releasing volatile carbon compounds, like for example methane, ethane, benzene and others, which can be easily removed. The silicon oxide can then be easily eliminated using hydrofluoric acid, thereby allowing the metallic powder to be recuperated.

The procedure in this invention provides for the realisation of decorative items with excellent chemical-physical and mechanical properties.

The composite material of this invention and obtained using the above-mentioned procedure preferably has the following mechanical properties:

elongation at break higher than 100%;

breaking load value higher than 0.5 MPa;

Shore A hardness higher than 20.

By way of example, below are the results obtained with some trials carried out on some samples of composite materials made with the procedure described above.

The samples were made with a bicomponent silicone resin (including a base component containing Polydialkyl siloxane, Polydiaryl siloxane or Polyalkyl/polyaryl siloxane with functional vinyl groups ($CH=CH_2$), and having a viscosity of 10,000 mPas and a specific weight of 1.05 g/cm3 and a reticulating agent containing Polyalkyl(hydro) siloxanes or Polydialkyl/polyaryl hydro siloxanes with hydride groups (Si—H) present in intermediate positions and/or terminal positions in the polymeric chain, reticulated using a platinum-catalysed addition reaction. The samples of composite material were made with the addition of gold powder, composed of particles with basically a planar and polygonal shape, with titres of 9 KT (i.e. with a content of 37.5% precious metal) and 14 KT (i.e. with a content of 58.3% precious metal).

Figure 2:
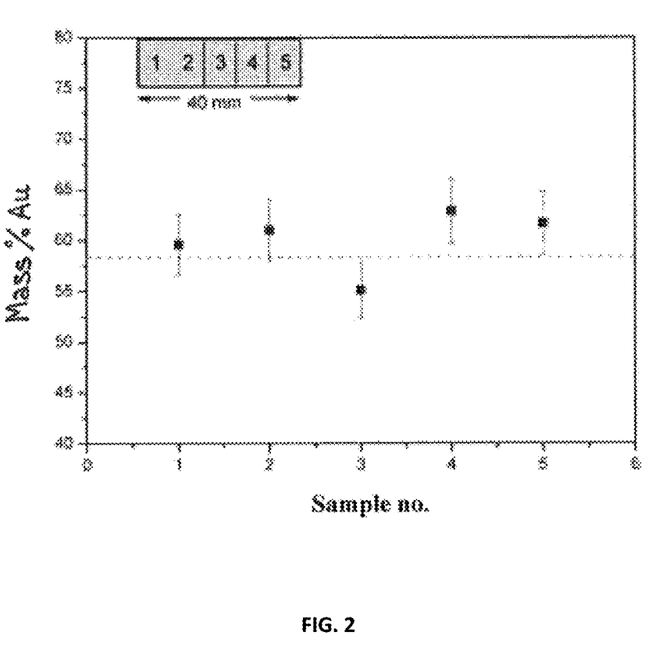
FIGS. 2-5 are different graphs of test data according to at least example.

First of all the exact composition of the samples was measured, in order to assess the exact homogeneity of the titre. By way of example, FIG. 2 shows the measurement carried out on five different segments of a sample with a titre of 14 KT. As we can see from the diagram, the titre manifests minimal fluctuations with respect to the mean value.

The elongation at break values, measured accordance with ASTM D1708 on the above-mentioned samples and on a reference sample made solely with the reticulated silicone resin and reported below in Table I, evidenced a minimum reduction of this parameter in the case of the sample with a titre of 9 KT.

TABLE 1

| Sample | Elongation at break [%] |
|---|---|
| Just resin | 268% |
| Titre 9 KT | 256% |
| Titre 14 KT | 159% |

Both samples loaded with gold particles, in any event, displayed excellent elongation properties. Also measured were the tensile load and the Shore A hardness (measured according to ASTM D2240). The values obtained are shown in Tables 2 and 3 respectively. The sample with a titre of 9 KT showed a higher breaking load and a greater Shore A hardness than the sample made of just resin and the sample with a titre of 14 KT.

TABLE 2

| Sample | Breaking load [MPa] |
|---|---|
| Just resin | 0.92 |
| Titre 9 KT | 1.07 |
| Titre 14 KT | 0.92 |

TABLE 3

| Sample | Shore A hardness |
|---|---|
| Just resin | 19 |
| Titre 9 KT | 35 ± 5 |
| Titre 14 KT | 28 ± 3 |

Figure 3:
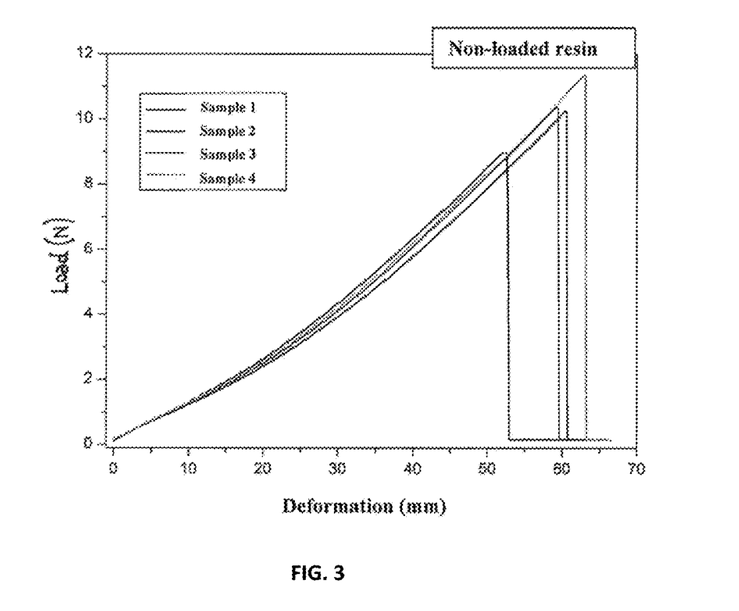
Figure 4:
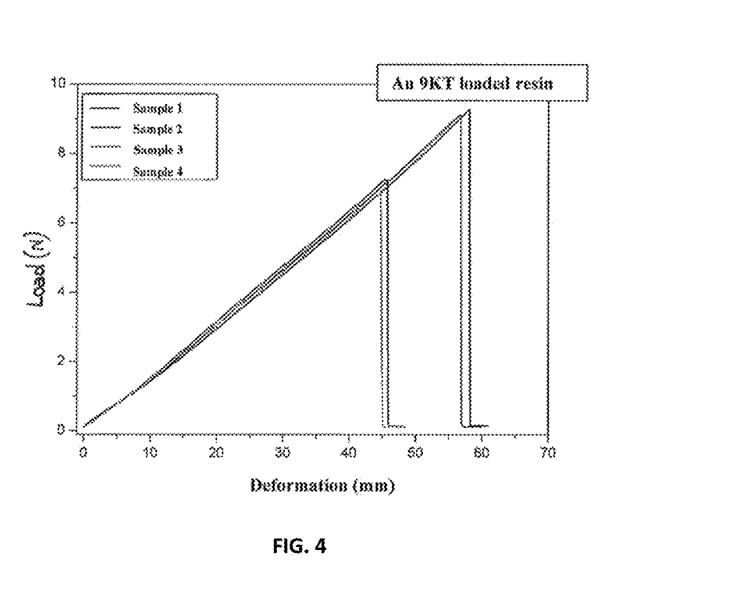

Shown below are the load-strain curves obtained for various samples just of reticulated resin (FIG. 3) and for various samples of resin with a titre of 9 KT (FIG. 4).

Also a corrosion test with artificial sweat was carried out (in accordance with UNI EN 1811), using a solution with the following chemical composition:

0.5% NaCl 0.1% urea 0.1% lactic acid deionised water

The test was carried out on two samples made with resin mentioned above and with the addition of gold powder, with titres of 9 KT (i.e. with a content of 37.5% precious metal) and 18 KT (i.e. with a content of 75% precious metal). The samples were then immersed in the artificial sweat solution and kept there for a few days at a constant temperature of 35° C.

Figure 5:
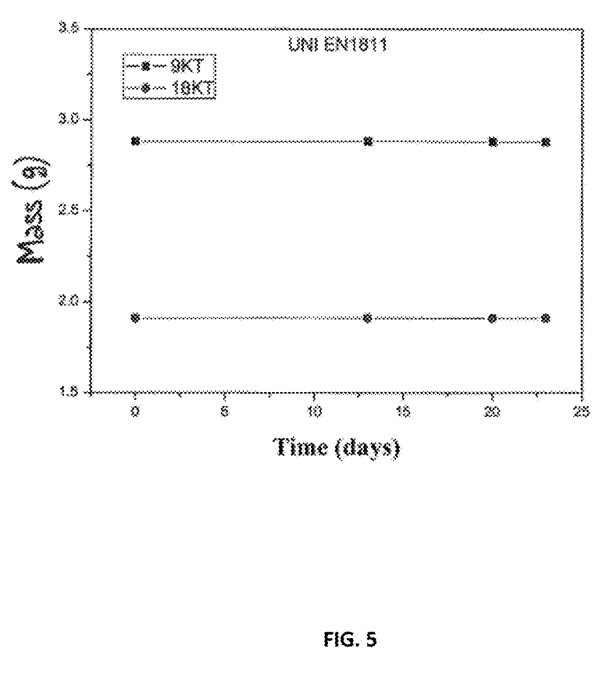

The results, shown in FIG. 5, demonstrate that the samples have not experienced any corrosion, with their weight having stayed the same the whole time.

Lastly, chemical resistance tests were carried out on the samples made just of reticulated resin. In particular there was an evaluation of the chemical resistance of the resin to potentially aggressive substances, like for example acetone, ethyl alcohol, hydrogen peroxide at 35%, liquid soap for the hands, moisturising cream for the face and sodium hypochlorite (bleach).

These substances were kept on the surface of the samples for 48 hours. At the conclusion of the tests, the samples were fully intact and there was no sign of any alteration due to the reagent on the surface of the sample, which was neither dull nor rough.

The invention conceived in this way attains the objectives that were set.

Obviously, this could, in its practical realisation, also take on forms and configurations different from that described above without leaving this sphere of protection.

Moreover, all the particulars could be replaced by technically equivalent elements and there could be any dimensions, forms and materials according to what is required.

What is claimed is:

1. A composite material for making decorative items, the composite material comprising:

at least a substantially transparent polymeric component, the substantially transparent polymeric component exhibiting a light radiation transmission percentage in the visible spectrum greater than 70%; and at least a metallic powder including one or more precious metals present individually or as an alloy, dispersed in said substantially transparent polymeric component in an amount in weight of between 2% and 95%;

wherein said metallic powder includes, at least 70%, plate-like particles with a nanometric thickness of between 5 and 300 nm and a preferential growth in a two-dimensional surface with at least a dimension of between 0.6 and 100 μm.

2. The composite material according to claim 1, wherein said metallic powder contains gold particles obtained using synthesis with a method that employs polyoils, in the presence of capping agents that prevent the growth of the particles along a spatial direction, giving the particles a plate-like form.

3. The composite material according to claim 1, wherein said substantially transparent polymeric component includes an elastomeric material.

4. The composite material according to claim 3, wherein said elastomeric material includes a silicone resin.

5. The composite material according to claim 4, wherein the silicone resin is temperature vulcanizable at room temperature.

6. A method for making decorative items, the method comprising:
 at least a stage for preparing a base component including a silicone resin;
 at least a stage for preparing a metallic powder containing particles with a nanometric thickness of between 5 and 300 nm and a preferential growth in a two-dimensional surface with at least a dimension of between 0.6 and 100 μm;
 at least an initial phase for mixing the metallic powder with the silicone resin of the base component, to obtain an even mixture; and
 at least a phase for reticulating the base component in said even mixture with the metallic powder distributed in a homogeneous way.

7. The method according to claim 6, further comprising:
 a phase for casting said homogeneous mixture in a mold for forming the decorative item, when said mixture has reached, by means of a first part of said reticulation phase, a viscosity greater than at least 5,000 mPas;
 at least a second part of said phase for reticulating said silicone resin base component in said homogeneous mixture inside said mold; and
 a phase for extracting said decorative item from said mold.

8. The procedure according to claim 7, wherein said second part of the reticulation phase is continued until the decorative article obtained from the reticulation of said homogeneous mixture can no longer be deformed under action of a weight of said decorative article.

9. The method according to claim 6, further comprising at least an initial phase for degassing the mixture containing said metallic powder and said silicone resin base component in a vacuum chamber.

10. The procedure according to claim 9, wherein said initial phase for degassing the mixture containing said metallic powder and said silicone resin base component in said vacuum chamber is performed after said initial mixing phase, in order to remove air trapped in said mixture.

11. The method according to claim 6, further comprising at least a phase for adding a reticulating component to said silicone resin of the base component before or after it is mixed with said metallic powder, in order that said silicone resin of the base component can be reticulated.

12. The method according to claim 11, further comprising:
 wherein said phase for adding said reticulating component is after said degassing phase; and
 a second phase for mixing said reticulating component with said homogeneous mixture.

13. The method according to claim 6, wherein said stage for preparing a metallic powder contains a phase for synthesizing plate-like gold particles using a method that employs polyoils, in the presence of capping agents that prevent the growth of the particles along a spatial direction.

14. The method according to claim 6, wherein said phase for preparing a metallic powder provides for the recuperation of said metallic powder from a decorative item that is no longer used, or else from process leftovers by a process including:
 a phase for heating the decorative item in air, or else process waste, up to a temperature of at least 600° C. to transform the silicone resin, in which the metallic powder is dispersed into silicone oxide and volatile carbon compounds; and
 a phase for eliminating the silicone oxide using hydrofluoric acid to free the metallic powder.

* * * * *